(12) United States Patent
Meyer

(10) Patent No.: US 8,584,369 B2
(45) Date of Patent: Nov. 19, 2013

(54) ASSEMBLY FOR AN ANGULAR POSITION MEASURING DEVICE

(75) Inventor: Hermann Meyer, Schneizlreuth (DE)

(73) Assignee: Dr. Johannes Heisenhain GmbH, Traunreut (DE)

( * ) Notice: Subject to any disclaimer, the term of this patent is extended or adjusted under 35 U.S.C. 154(b) by 311 days.

(21) Appl. No.: 13/087,042

(22) Filed: Apr. 14, 2011

(65) Prior Publication Data

US 2011/0254542 A1 Oct. 20, 2011

(30) Foreign Application Priority Data

Apr. 19, 2010 (DE) .......................... 10 2010 027 900

(51) Int. Cl.
*G01D 21/00* (2006.01)
(52) U.S. Cl.
USPC .......................................................... 33/1 PT
(58) Field of Classification Search
USPC ................... 33/1 PT, 1 N, 572, 706, 707, 708
See application file for complete search history.

(56) References Cited

U.S. PATENT DOCUMENTS

| | | | | |
|---|---|---|---|---|
| 6,617,571 B2 * | 9/2003 | Thaler et al. | ............. | 250/231.13 |
| 6,668,464 B2 * | 12/2003 | Mitterreiter et al. | .......... | 33/1 PT |
| 7,094,079 B2 * | 8/2006 | Meyer et al. | ................... | 439/135 |
| 7,855,552 B2 * | 12/2010 | Steinich | ......................... | 33/1 PT |
| 7,866,436 B2 * | 1/2011 | Yamanaka | ..................... | 180/444 |
| 7,928,726 B2 * | 4/2011 | Itomi | ........................ | 324/207.25 |
| 2002/0000512 A1 * | 1/2002 | Thaler et al. | ............ | 250/231.13 |
| 2002/0148123 A1 * | 10/2002 | Mitterreiter et al. | .......... | 33/1 PT |
| 2005/0181649 A1 * | 8/2005 | Meyer et al. | ................... | 439/144 |
| 2011/0088488 A1 * | 4/2011 | Maehara | ................... | 73/862.333 |
| 2011/0194954 A1 * | 8/2011 | Sakata et al. | ............... | 417/410.1 |
| 2011/0254542 A1 * | 10/2011 | Meyer | ...................... | 324/207.25 |
| 2013/0113470 A1 * | 5/2013 | Kegeler et al. | ........... | 324/207.25 |

FOREIGN PATENT DOCUMENTS

JP 2001-289668 10/2001

* cited by examiner

*Primary Examiner* — Yaritza Guadalupe-McCall
(74) *Attorney, Agent, or Firm* — Kenyon & Kenyon LLP

(57) ABSTRACT

An assembly for an angular position measuring device includes a shaft having a measuring standard for measuring a rotational movement about an axis. The shaft has a shoulder as an integral component, on which a roller bearing is mounted in axial abutment. Arranged between the shoulder of the shaft and the roller bearing is a groove which is oriented with a radial directional component and is connected to a hollow space for receiving lubricant, the hollow space being bounded in the radial direction by a ring of the roller bearing and by the shaft.

12 Claims, 4 Drawing Sheets

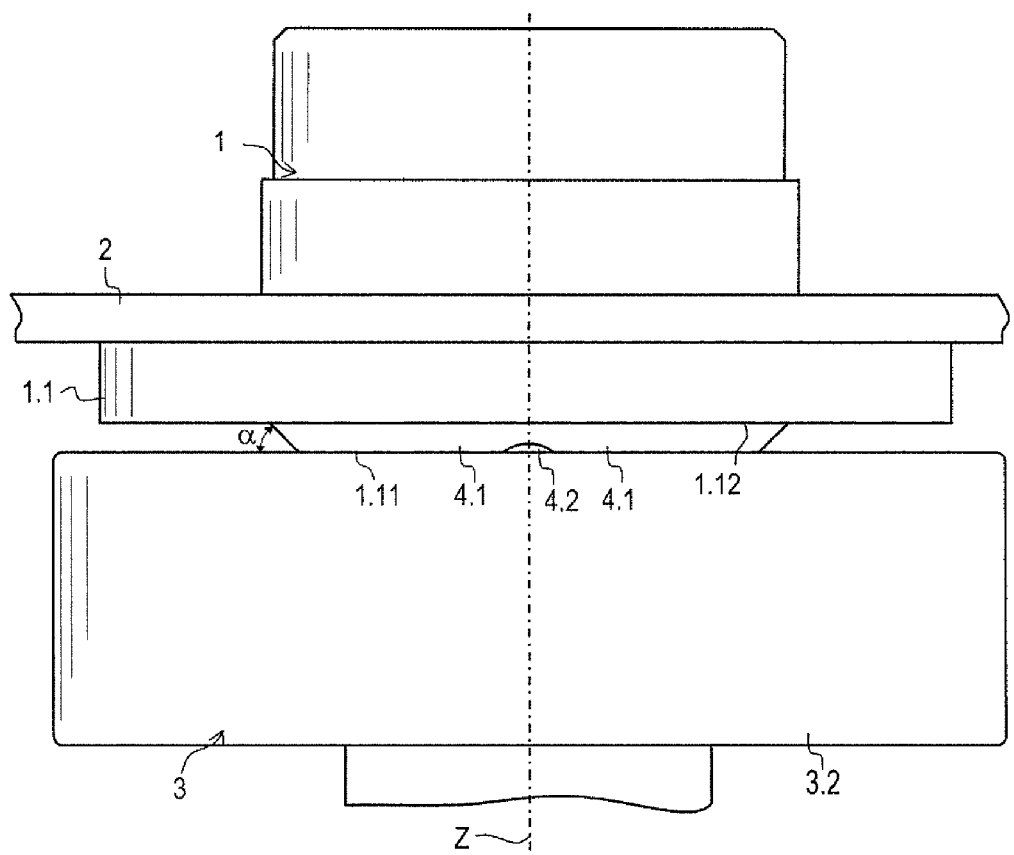

ASSEMBLY FOR AN ANGULAR POSITION MEASURING DEVICE

CROSS-REFERENCE TO RELATED APPLICATIONS

The present application claims priority to Application No. 10 2010 027 900.5, filed in the Federal Republic of Germany on Apr. 19, 2010, which is expressly incorporated herein in its entirety by reference thereto.

FIELD OF THE INVENTION

The present invention relates to an assembly for an angular position measuring device.

BACKGROUND INFORMATION

Angular position measuring devices, also frequently referred to as rotary encoders, are used to measure rotational movements of a rotationally mounted machine part, particularly a shaft, over one or more revolutions. In so doing, the rotational movement is recorded incrementally or absolutely. In connection with gear racks and gear wheels or with threaded spindles, linear motions can also be measured by an angular position measuring device. Such angular position measuring devices are often used in conjunction with electric motors to generate a commutation signal.

As a rule, angular position measuring devices of this type have an assembly which includes a shaft having a measuring standard, and a roller bearing. Angular position measuring devices which must satisfy comparatively high demands with regard to measuring accuracy frequently operate according to an optical measuring principle, the measuring standard then often being arranged as a glass ring, for example, having an angle scaling applied thereon. In this case, the angle scaling is scanned by an incident light technique or by a transmitted light technique. In order to ensure high measuring accuracy, it is important that the measuring standard be protected from contaminants. It may be particularly disadvantageous if lubricant or components thereof escape from the roller bearing and deposit on the measuring standard, especially in the area of the angle scaling. Such contaminants are often in the form of droplets, and exhibit an optical effect, similar to a lens. Under such circumstances, the light beams are deflected accordingly, which can lead to a faulty measurement.

Japanese Patent Document No. 2001-289668 describes an assembly for an angular position measuring device which has a shaft on which a separate add-on member is mounted. A measuring standard is affixed on the add-on member. A channel is provided between the add-on member and the shaft to drain off lubricant.

An assembly of this kind has the disadvantage that it is generally accompanied by comparatively great measuring errors. The reason is that on one hand, there is the danger that the measuring standard will not be centered with sufficient precision relative to the axis of rotation, and in addition, that wobble errors will occur. Furthermore, in a conventional arrangement, lubricant can escape from the channel again, or fluids from the interior of the hollow shaft can get onto the measuring standard via the channel.

SUMMARY

Example embodiments of the present invention provide an assembly for an angular position measuring device, by which high measuring accuracy is reliably and long-lastingly attainable.

According to example embodiments of the present invention, an assembly includes a shaft having a measuring standard for measuring a rotational movement about an axis, and a roller bearing. The shaft has a shoulder as an integral part, on which the roller bearing is mounted in axial abutment. The shoulder and the shaft are thus formed in one piece. Situated between the shoulder and the roller bearing is at least one groove which is oriented with a radial directional component and is connected to a hollow space suitable for receiving lubricant. The hollow space is bounded in the radial direction by a ring of the roller bearing and by the shaft, therefore, the radial extension of the hollow space is thus limited by the surfaces of the ring and of the shaft. For example, the orientation of the at least one groove having a radial directional component includes a severely radial orientation or a shape corresponding to a spiral segment.

For instance, the measuring of a rotational movement includes the determination of an existing rotational position or rotational speed. In particular, the inner ring may be viewed as ring of the roller bearing. Moreover, a lubricant which is used during operation of the angular position measuring device may be viewed hereinafter as lubricant, especially the lubricant in the roller bearing or perhaps only components thereof, e.g., an oil.

The assembly may be configured such that the ring touches a contact surface of the shoulder, the at least one groove adjoining the contact surface. The contact surface may include a plurality of ring segments, between which the grooves are situated. Preferably, the contact surface or the contact surfaces is/are planar, and in addition, may be disposed in one plane which is intersected orthogonally by the axis.

Alternatively, the at least one groove may be incorporated in a separate intermediate piece, e.g., an intermediate ring, which is arranged between the shoulder and the ring of the roller bearing. In this case, in view of the achievable measuring accuracy, it is advantageous if the roller bearing and the measuring standard are attached directly to the one-piece shaft, without intermediate pieces.

For example, the contact surface and the ring are machined such that the section in which the contact surface touches the ring acts like a seal, especially for the lubricant. In this manner, it is possible to dispense with additional joint gaps or seals, which leads to a more precise structural form of the assembly, and as a result, minimizes the measuring errors of the corresponding angular position measuring device.

For example, the hollow space may be produced as a recess in the shaft. The ring of the roller bearing may thus have a smooth surface which may be joined precisely with the corresponding mating surfaces of the shaft that are adjacent to the recess. High measuring accuracy results from this measure, as well, since eccentricity errors and wobble errors are minimized due to the configuration.

The hollow space may extend along the entire circumference or along a partial circumference of the shaft. Furthermore, the hollow space may include a helically-shaped space, which also may extend over an angle at circumference of more than 360°.

The roller bearing may include a seal, the ring of the roller bearing, which at the same time has a limiting wall for the hollow space, being rotatable relative to the seal.

The assembly may be configured such that in relation to the axial direction, the shoulder is disposed between the measuring standard and the bearing. Correspondingly, the one-piece shaft has a smaller diameter in the section which is in contact with the inner ring of the roller bearing than in the area of the contact surface. Furthermore, the diameter of the shaft in a section to which the measuring standard is attached is larger than the diameter in the area of the contact surface.

The assembly may have a gap for directing the lubricant, especially in the circumferential direction, to the groove. The gap is bounded by walls which are oriented orthogonally or at an acute angle, thus, an angle of less than or equal to 90°. In addition, the assembly may have a further gap for draining the lubricant out of the groove, this further gap being bounded by walls which are oriented orthogonally or at an acute angle relative to each other. In particular, the lubricant may be discharged from the groove in the circumferential direction; in further tracking of the lubricant, an axially inwardly directed movement of the lubricant also occurs. To optimize the forwarding of the lubricant, in particular, the angle of the first gap may be greater than or equal to the angle of the further gap, especially greater than the angle of the further gap.

In addition, the at least one groove may adjoin a contact surface of the shoulder, and the inner surface of the groove may form an angle with the contact surface which is less than or equal to 90°.

The assembly may be configured such that the groove extends in the radial direction outwardly over the inner periphery of the ring. For example, in such a configuration, the gap for directing the lubricant to the groove may be bounded by walls which are not oriented at an acute angle.

According to an example embodiment of the present invention, an assembly for an angular position measuring device includes: a measuring standard adapted to measure a rotational movement about an axis; a roller bearing; and a shaft having the measuring standard mounted thereon, the shaft including a shoulder as an integral component on which the roller bearing is mounted in axial abutment. At least one groove is arranged between the shoulder of the shaft and the roller bearing, the groove is oriented with a radial directional component and connected to a hollow space adapted to receive lubricant, and the hollow space is bounded in the radial direction by a ring of the roller bearing and by the shaft.

The ring may touch a contact surface of the shoulder, and the at least one groove may adjoin the contact surface.

The contact surface and the ring may be machined such that a section in which the contact surface touches the ring acts as a seal.

The hollow space may be arranged as a recess in the shaft.

The hollow space may extend along a periphery of the shaft.

The hollow space may include a helically-shaped space.

The roller bearing may include a seal, and the ring of the roller bearing may be rotatable relative to the seal.

The assembly may be configured such that, in relation to the axial direction, the shoulder is arranged between the measuring standard and the bearing.

The assembly may include a gap adapted to direct the lubricant to the at least one groove, and the gap may be bounded by walls oriented one of (a) orthogonally and (b) at an acute angle relative to each other.

The assembly may include a further gap adapted to drain the lubricant out of the at least one groove, and the further gap may be bounded by walls oriented one of (a) orthogonally and (b) at an acute angle relative to each other.

An angle of the gap may be greater than or equal to an angle of the further gap.

The at least one groove may adjoin a contact surface of the shoulder, and an inner surface of the groove may form an angle with the contact surface which is less than or equal to 90°.

Other features and aspects of example embodiments of the present invention are described in more detail below with reference to the appended Figures.

BRIEF DESCRIPTION OF THE DRAWINGS

FIG. 4 is a side view of the assembly.

DETAILED DESCRIPTION

Figure 1:
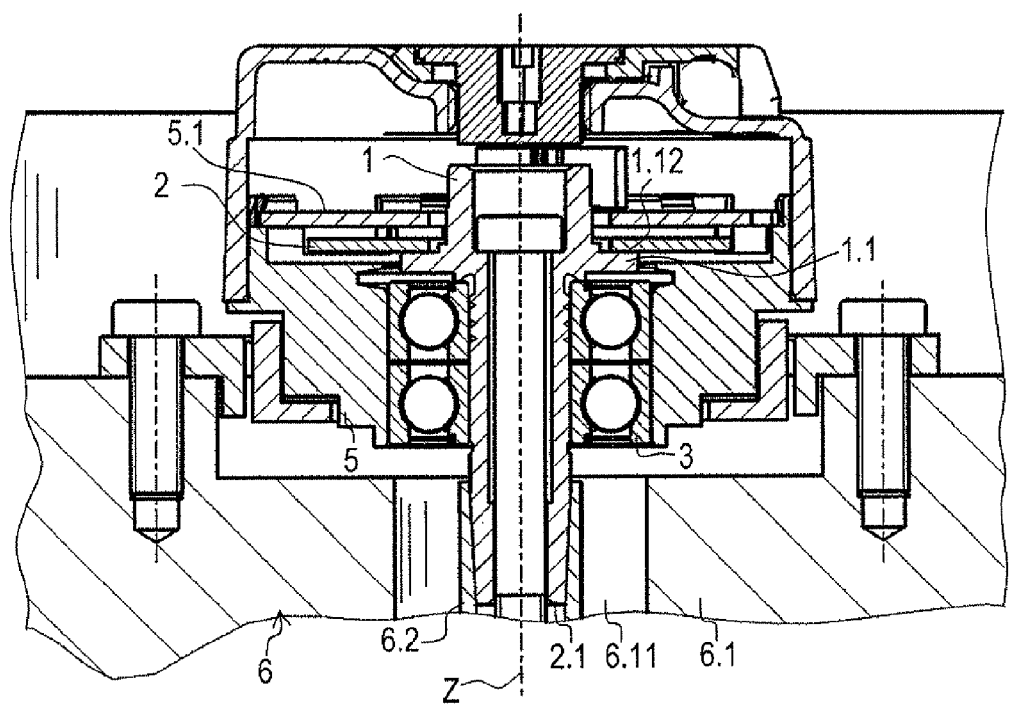
FIG. 1 shows a longitudinal cross-sectional view of an angular position measuring device.
Figure 2:
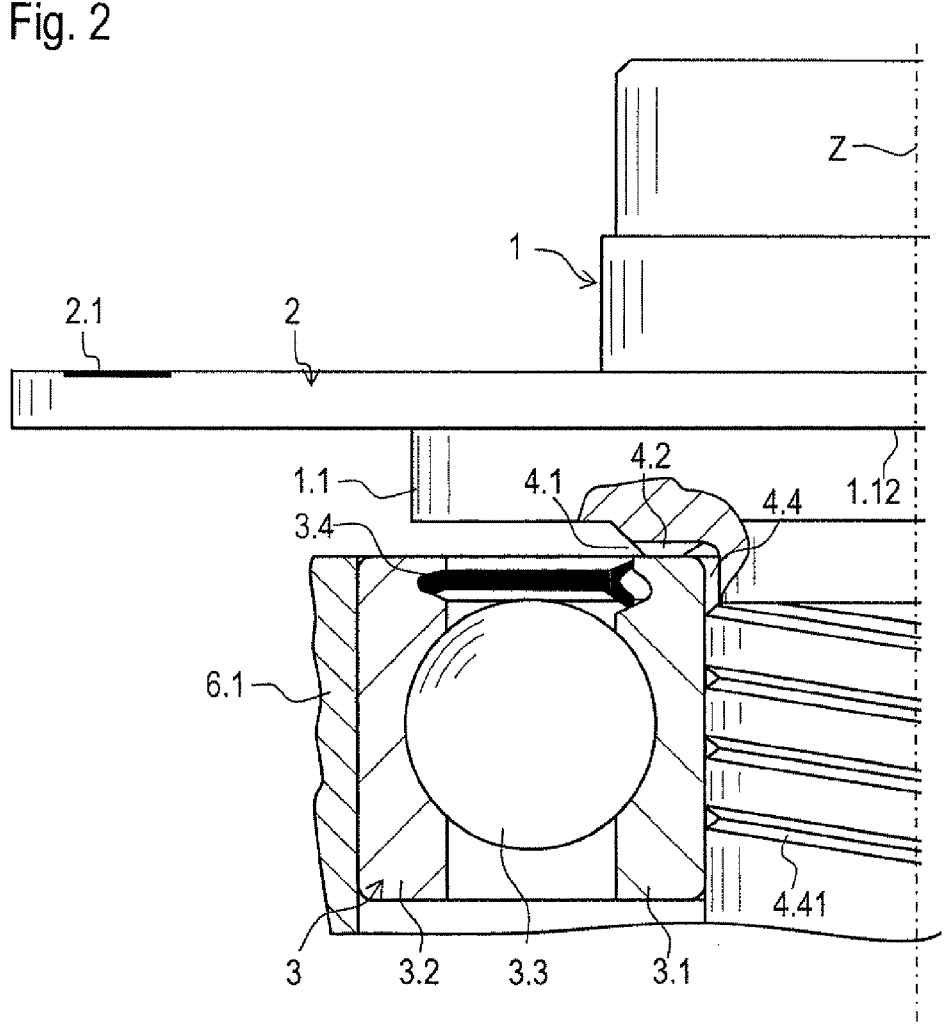
FIG. 2 is an enlarged view of the assembly in longitudinal cross-section, having a shaft and a bearing.
Figure 3A:
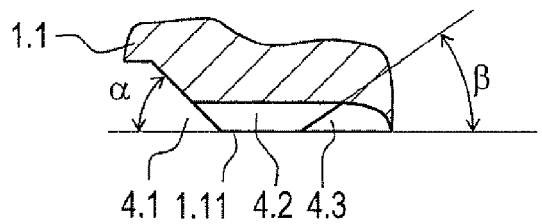
FIG. 3a is a cross-sectional view of a groove for passing on lubricant.
Figure 3B:
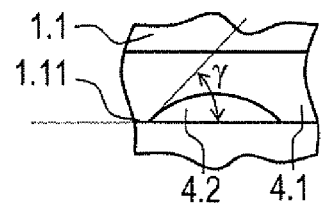
FIG. 3b is a side view of the groove for passing on lubricant.
Figure 5:
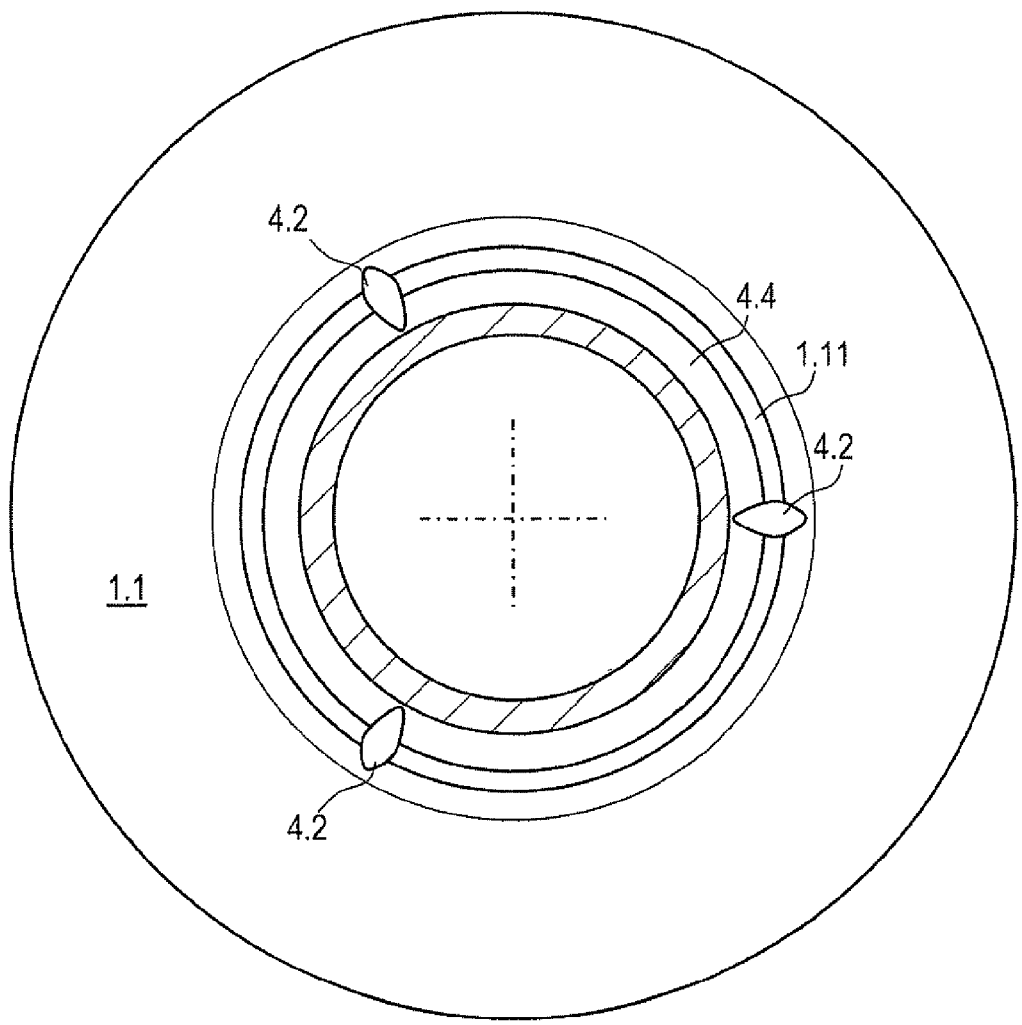
FIG. 5 is a top view of the shaft of the assembly.

The angular position measuring device, shown in a center longitudinal cross-sectional view in FIG. 1, includes a stator and a rotor. The rotor has a one-piece shaft 1 having a shoulder 1.1 that is machined out of a monolithic semi-finished product with the aid of a turning operation. Shoulder 1.1 has a joining surface 1.12 oriented orthogonally with respect to axis Z (see also FIG. 2). On it, a measuring standard 2 is fixedly joined by an adhesive, in a centric manner relative to axis Z and with only slight tolerance deviations. Measuring standard 2, on which an angle scaling 2.1 is applied, is ring-shaped and made of glass, measuring standard 2 being produced with high precision in terms of its dimensional accuracy and planarity. Angle scaling 2.1 is illustrated in FIG. 2. For example, it may be implemented as an incremental graduation having radially oriented scale lines, or as an absolute code. Shaft 1 is rotationally mounted by a bearing, here two roller bearings 3, within a body 5 which is to be assigned to the stator. In the example illustrated, measuring standard 2, i.e., its angle scaling 2.1, is scanned photoelectrically by a scanning device 5.1 which is secured on body 5. Suitable photosensitive detectors are provided on scanning device 5.1 arranged as a printed circuit board. Moreover, among other things, electrical components for signal conditioning—e.g., for amplification and digitizing—of the scanning signals supplied by the detectors are disposed on the printed circuit board or on scanning device 5.1. An electrical connection is produced between the angular position measuring device and sequential electronics via a connecting cable, so that electric signals and electrical energy may be transmitted between the sequential electronics and the angular position measuring device.

The angular position measuring device is intended for mounting on a machine 6. To accommodate the angular position measuring device, provided on a stator-side machine part 6.1 is a graduated, hollow-cylindrical recess 6.11, into which a rotor-side motor shaft 6.2 projects centrally. Moreover, shaft 1 is arranged for the rotatably fixed connection to a component to be measured, for instance, to a motor shaft 6.2. For example, the connection between shaft 1 of the angular position measuring device and motor shaft 6.2 is realized by a connecting device in the form of a mounting screw projecting through shaft 1, the end of shaft 1 being tapered for this purpose. Therefore, in accordance with the intended purpose, motor shaft 6.2 is joined rigidly to shaft 1 of the angular position measuring device.

Thus, the relative angular position between the stator and the rotor is able to be determined by the angular position measuring device. Such angular position measuring devices are often referred to rotary encoders, as well.

An assembly of the angular position measuring device, including shaft 1, measuring standard 2 and one of the roller bearings 3, is shown in detail in FIG. 2. Roller bearing 3 has an inner ring 3.1, an outer ring 3.2 as well as rolling elements 3.3. For perfect operation, it is necessary that roller bearing 3 be lubricated, which is why lubricant, i.e., lubricating grease, is provided between inner ring 3.1 and outer ring 3.2. An annular seal 3.4 is to be used basically to keep the lubricant or lubricating grease in roller bearing 3 and prevent it from migrating in the direction of optically scannable measuring standard 2. Seal 3.4 is firmly joined to outer ring 3.2, so that no relative movement takes place between seal 3.4 and outer ring 3.2 during operation of the angular position measuring device. On the other hand, sealing lips of seal 3.4 rub against inner ring 3.1 when there is a rotational movement of roller bearing 3.

According to FIGS. 2, 3*a*, 3*b* and 5, shaft 1, particularly shoulder 1.1, has a contact surface 1.11, which is in touch contact with inner ring 3.1. According to FIG. 5, contact surface 1.11 is interrupted by three grooves 4.2 which are disposed along the periphery, offset by 120°, so that each of grooves 4.2 thus adjoins contact surface 1.11. Contact surface 1.11 is oriented orthogonally with respect to axis Z. Consequently, in the exemplary embodiment illustrated, contact surface 1.11 and joining surface 1.12 of shoulder 1.1 are oriented in parallel relative to each other. This parallelism is able to be produced with great accuracy, because both contact surface 1.11 and joining surface 1.12 are produced in a machining step during the cutting process of producing the monolithic shaft. This type of construction ultimately improves the measuring accuracy of the angular position measuring device, since wobble-error movements of measuring standard 2 are reduced to a minimum.

For example, because of heating during the operation of the angular position measuring device, lubricant or components of the lubricant, i.e., lubricating grease, may escape from roller bearing 3, particularly in the area of the sealing lips. In order to avoid measuring errors, care must be taken that the escaping lubricant does not get onto measuring standard 2, and thus interfere with the optical properties of angle scaling 2.1. For this purpose, recesses which form a capillary channel are incorporated in one-piece shaft 1. On the one hand, in the exemplary embodiment illustrated, inner ring 3.1 of roller bearing 3 is not machined in a manner that it would have channels for receiving lubricant.

Due to capillary forces, the escaped lubricant is initially captured in a gap 4.1 which is bounded by walls of inner ring 3.1 and of shoulder 1.1, and is situated in close proximity to the sealing lips of sealing ring 3.4. Because of the tapered shape of shoulder 1.1 in the boundary region to contact surface 1.11, the walls in question are oriented at an acute angle $\alpha$, here 45°, relative to each other. In general, the lubricant gets into gap 4.1 between grooves 4.2. As a result of capillary forces, the lubricant flows along the periphery in gap 4.1 until finally the lubricant enters into a groove 4.2, so that the lubricant is thus directed toward groove 4.2 with the aid of specially shaped gap 4.1. To improve their ability to receive lubricant, each groove 4.2 is shaped such that its inner surface forms an angle $\gamma$ with contact surface 1.11 at the edge at which the inner surface coincides with contact surface 1.11, angle $\gamma$ in the present exemplary embodiment being 45°. The capillary forces are increased by this acute angle, so that the lubricant is drawn into grooves 4.2. Contact surface 1.11, as well as the face section of inner ring 3.1 which touches contact surface 1.11, are machined so exactly by a grinding process that the section in question acts like a seal, so that no lubricant is able to radially penetrate contact surface 1.11 here.

At the radially inner end of grooves 4.2, the excess lubricant arrives at a further gap 4.3, which is bounded by the wall of inner ring 3.1 and the wall of shaft 1 in the form of an undercut, forming a further acute angle $\beta$. In the exemplary embodiment shown, this angle $\beta$ is 30°. Incidentally, it should be noted that angles $\alpha$, $\beta$ and $\gamma$ relate to the inside gap angles between the walls in question, thus, relate to those angles which are relevant in terms of capillary effects. With regard to the draining off of the lubricant, an angle $\alpha$ is greater than or equal to angle $\beta$ should be provided. In particular, it is advantageous if the assembly is configured such that at least one of the relationships $\alpha \geq \beta$, $\alpha \geq \gamma$ or $\alpha \geq \gamma \geq \beta$, especially $90° \geq \alpha \geq \gamma \geq \beta$ is satisfied.

The lubricant thereupon creeps in the radial direction along the face of inner ring 3.1 within a gap 4.3 to a hollow space 4.4, which extends along the periphery of shaft 1, and in addition, includes a helically-shaped space 4.41 to increase the receiving volume. Thus, hollow space 4.4 is bounded in the radial direction by inner ring 3.1 of roller bearing 3 and by shaft 1. Hollow space 4.4 represents the volume in which escaped lubricant finally remains, without the measurement being able to be disturbed. Thus, driven by capillary forces, escaping lubricant flows through a channel which includes a first gap 4.1, a groove 4.2, a further gap 4.3 and a hollow space 4.4. In this context, it is important that the lubricant does not creep back again in the direction of measuring standard 2. This is prevented by the particular configuration of the assembly. First of all, hollow space 4.4, including helically-shaped space 4.41, is bounded radially outside by inner ring 3.1, i.e., the concave lateral side of inner ring 3.1, so that even in the event of centrifugal forces occurring when shaft 1 rotates, the lubricant does not creep back. Moreover, the dimensioning of angles $\alpha$ and $\beta$ ($\alpha \geq \beta$) ensures that the capillary forces act radially inwardly. Incidentally, apart from grooves 4.2, there is no connection of hollow space 4.4 to the surroundings, not even into the hollow-cylindrical interior space of shaft 1, so that there is no danger that fluids or lubricant would get into hollow space 4.4 by another path, and would make draining or receiving of lubricant from the relevant area of measuring standard 2 impossible. Finally, the channel indicated above is arranged such that the capillary forces act over the entire length of the channel, particularly due to the fact that, starting from first gap 4.1, the effective gap width does not increase across groove 4.2, further gap 4.3 and hollow space 4.4.

Therefore, by the use of the assembly described herein, an angular position measuring device may be provided with which high measuring accuracy is achievable, since on one hand, insignificant eccentricity errors and/or wobble errors are achievable, accompanied at the same time by avoidance of contamination of the measuring standard.

What is claimed is:

1. An assembly for an angular position measuring device, comprising:
a measuring standard adapted to measure a rotational movement about an axis;
a roller bearing; and
a shaft having the measuring standard mounted thereon, the shaft including a shoulder as an integral component on which the roller bearing is mounted in axial abutment;
wherein at least one groove is arranged between the shoulder of the shaft and the roller bearing, the groove oriented with a radial directional component and connected to a hollow space adapted to receive lubricant, the hollow space bounded in an outwardly radial direction by a ring of the roller bearing and in an inwardly radial direction by the shaft.

2. The assembly according to claim 1, wherein the ring touches a contact surface of the shoulder, and the at least one groove adjoins the contact surface.

3. The assembly according to claim 1, wherein the hollow space is arranged as a recess in the shaft.

4. The assembly according to claim 1, wherein the hollow space extends along a periphery of the shaft.

5. The assembly according to claim 1, wherein the roller bearing includes a seal, and the ring of the roller bearing is rotatable relative to the seal.

6. An assembly for an angular position measuring device, comprising:
   a measuring standard adapted to measure a rotational movement about an axis;
   a roller bearing; and
   a shaft having the measuring standard mounted thereon, the shaft including a shoulder as an integral component on which the roller bearing is mounted in axial abutment;
   wherein at least one groove is arranged between the shoulder of the shaft and the roller bearing, the groove oriented with a radial directional component and connected to a hollow space adapted to receive lubricant, the hollow space bounded in the radial direction by a ring of the roller bearing and by the shaft;
   wherein the ring touches a contact surface of the shoulder, and the at least one groove adjoins the contact surface; and
   wherein the contact surface and the ring are machined such that a section in which the contact surface touches the ring acts as a seal.

7. An assembly for an angular position measuring device, comprising:
   a measuring standard adapted to measure a rotational movement about an axis;
   a roller bearing; and
   a shaft having the measuring standard mounted thereon, the shaft including a shoulder as an integral component on which the roller bearing is mounted in axial abutment;
   wherein at least one groove is arranged between the shoulder of the shaft and the roller bearing, the groove oriented with a radial directional component and connected to a hollow space adapted to receive lubricant, the hollow space bounded in the radial direction by a ring of the roller bearing and by the shaft;
   wherein the hollow space extends along a periphery of the shaft; and
   wherein the hollow space includes a helically-shaped space.

8. An assembly for an angular position measuring device, comprising:
   a measuring standard adapted to measure a rotational movement about an axis;
   a roller bearing; and
   a shaft having the measuring standard mounted thereon, the shaft including a shoulder as an integral component on which the roller bearing is mounted in axial abutment;
   wherein at least one groove is arranged between the shoulder of the shaft and the roller bearing, the groove oriented with a radial directional component and connected to a hollow space adapted to receive lubricant, the hollow space bounded in the radial direction by a ring of the roller bearing and by the shaft; and
   wherein the assembly is configured such that, in relation to the axial direction, the shoulder is arranged between the measuring standard and the bearing.

9. An assembly for an angular position measuring device, comprising:
   a measuring standard adapted to measure a rotational movement about an axis;
   a roller bearing; and
   a shaft having the measuring standard mounted thereon, the shaft including a shoulder as an integral component on which the roller bearing is mounted in axial abutment;
   wherein at least one groove is arranged between the shoulder of the shaft and the roller bearing, the groove oriented with a radial directional component and connected to a hollow space adapted to receive lubricant, the hollow space bounded in the radial direction by a ring of the roller bearing and by the shaft; and
   wherein the assembly includes a gap adapted to direct the lubricant to the at least one groove, the gap bounded by walls oriented one of (a) orthogonally and (b) at an acute angle relative to each other.

10. An assembly for an angular position measuring device, comprising:
    a measuring standard adapted to measure a rotational movement about an axis;
    a roller bearing; and
    a shaft having the measuring standard mounted thereon, the shaft including a shoulder as an integral component on which the roller bearing is mounted in axial abutment;
    wherein at least one groove is arranged between the shoulder of the shaft and the roller bearing, the groove oriented with a radial directional component and connected to a hollow space adapted to receive lubricant, the hollow space bounded in the radial direction by a ring of the roller bearing and by the shaft; and
    wherein the assembly includes a further gap adapted to drain the lubricant out of the at least one groove, the further gap bounded by walls oriented one of (a) orthogonally and (b) at an acute angle relative to each other.

11. An assembly for an angular position measuring device, comprising:
    a measuring standard adapted to measure a rotational movement about an axis;
    a roller bearing; and
    a shaft having the measuring standard mounted thereon, the shaft including a shoulder as an integral component on which the roller bearing is mounted in axial abutment;
    wherein at least one groove is arranged between the shoulder of the shaft and the roller bearing, the groove oriented with a radial directional component and connected to a hollow space adapted to receive lubricant, the hollow space bounded in the radial direction by a ring of the roller bearing and by the shaft; and
    wherein the assembly includes:
    a first gap adapted to direct the lubricant to the at least one groove, the gap bounded by walls oriented one of (a) orthogonally and (b) at an acute angle relative to each other; and a second gap adapted to drain the lubricant out of the at least one groove, the further gap bounded by walls oriented one of (a) orthogonally and (b) at an acute angle relative to each other; and wherein an angle of the first gap is greater than or equal to an angle of the second gap.

12. An assembly for an angular position measuring device, comprising:

a measuring standard adapted to measure a rotational movement about an axis;

a roller bearing; and a shaft having the measuring standard mounted thereon, the shaft including a shoulder as an integral component on which the roller bearing is mounted in axial abutment;

wherein at least one groove is arranged between the shoulder of the shaft and the roller bearing, the groove oriented with a radial directional component and connected to a hollow space adapted to receive lubricant, the hollow space bounded in the radial direction by a ring of the roller bearing and by the shaft; and wherein the at least one groove adjoins a contact surface of the shoulder, and an inner surface of the groove forms an angle with the contact surface which is less than or equal to 90°.

* * * * *